United States Patent [19]

Ellis

[11] 4,047,698
[45] Sept. 13, 1977

[54] PALLET TRUCK AUTOMATIC LIFT

[75] Inventor: Arthur S. Ellis, Fort Erie, Canada

[73] Assignee: Blue Giant Equipment Corporation, Buffalo, N.Y.

[21] Appl. No.: 726,571

[22] Filed: Sept. 27, 1976

[51] Int. Cl.² .............................................. B66F 3/24
[52] U.S. Cl. .................................. 254/2 R; 280/43.12
[58] Field of Search ...................... 254/2 R, 2 B, 2 C; 280/43.12

[56] References Cited

U.S. PATENT DOCUMENTS 3,170,706    2/1965    Nichols .............................. 280/43.12

Primary Examiner—Robert C. Watson
Attorney, Agent, or Firm—Christel & Bean

[57] ABSTRACT

The present disclosure shows a pallet truck of the type wherein an electrically driven pump supplies a hydraulic cylinder with pressure fluid for raising the fork mechanism. For lowering the fork mechanism a dump valve exhausts hydraulic fluid from the cylinder. UP and DOWN push-button switches conventionally control the electric motor and the dump valve, respectively. The apparatus disclosed herein provides an alternate circuit which operates automatically when both push buttons are in their inactive positions and the fork mechanism is fully lowered or nearly fully lowered to raise the fork lift structure automatically a safe distance above the floor, whereupon the auxiliary circuit means becomes inactive.

10 Claims, 3 Drawing Figures

PALLET TRUCK AUTOMATIC LIFT

BACKGROUND OF THE INVENTION

This invention relates to pallet trucks and is shown and described herein as applied to what is known in the art as a "pallet truck walkie".

In this type of pallet truck the operator walks behind the truck and operates controls which effect propulsion of the pallet truck on supporting ground wheels, effect steering of the ground wheels, and effect raising and lowering movements of the forklift structure which engages beneath pallets to raise them, moves them about to a desired position, and then lowers the forklift mechanism whereby the load is deposited and the truck may be withdrawn from engagement with the pallets.

A serious problem exists in devices of this type since operators habitually lower the forklift structure to its lowermost position to withdraw the same from beneath the pallet and then leave the forklift structure in such position after the same has been withdrawn from beneath a load of pallets and while the truck is moved about on its ground wheels to ultimately engage beneath other pallets which are to be raised and moved. The result is that the fork portion of the structure may drag about in engagement with the surface on which the truck is operating whereby the under surfaces of the fork structure wear rapidly and become seriously damaged. This scraping of the fork structure on floors and the like is also harmful to the surfaces upon which the truck is operating.

SUMMARY OF THE INVENTION

The present invention provides means to avoid this harmful scraping action. The operator conventionally holds a DOWN button depressed to lower the fork structure and deposit pallets carried thereby and continues to hold the button depressed as he withdraws the fork structure from beneath the deposited pallets. In accordance with the present invention, when the operator releases the DOWN button with the fork structure in a fully lowered position after withdrawing the same from beneath a stack of pallets auxiliary means automatically come into play which automatically close the UP circuit of the forklift control mechanism and move the fork structure upwardly a slight distance to safely clear the floor whereupon a limit switch is acted upon to open this auxiliary UP circuit and leave the fork mechanism in this slightly raised position out of harmful contact with the floor.

DESCRIPTION OF THE ILLUSTRATED EMBODIMENT

Figure 1:
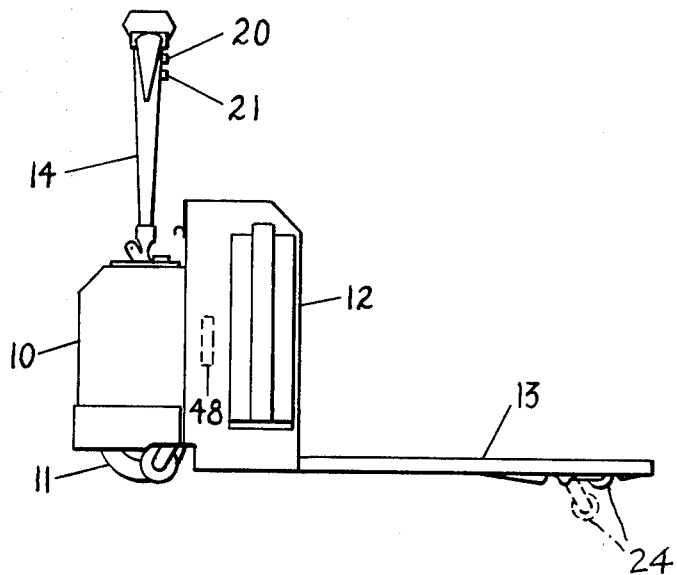
FIG. 1 is a general side-elevational view of one form of a pallet truck equipped in accordance with the present invention.

As generally illustrated in FIG. 1, a conventional pallet truck of the "walkie" type comprises a support structure 10 supported on motor driven steerable ground wheels indicated generally at 11 and a vertically movable fork structure 12 having a conventional pair of fork members 13 at its lower end. The fork structure 12 is connected to the support 10 for vertical sliding movement.

A control arm 14 is pivoted for movement in a longitudinal plane to control travel of the truck on the ground wheels and braking of the pallet truck and is pivoted in a transverse plane to effect steering of the ground wheels. Vertical movements of the fork structure 12 with respect to the support 10 are effected by UP and DOWN push buttons 20 and 21 in a manner which will be more fully described in conjunction with a description of the diagrammatic view, FIG. 2. All of the foregoing construction and operation is entirely conventional and well known to those familiar with the pallet truck art. As indicated at 24 in FIG. 1, collapsible ground wheels are provided at the lower sides of the forward ends of the fork members 13. This likewise is entirely conventional.

Figure 2:
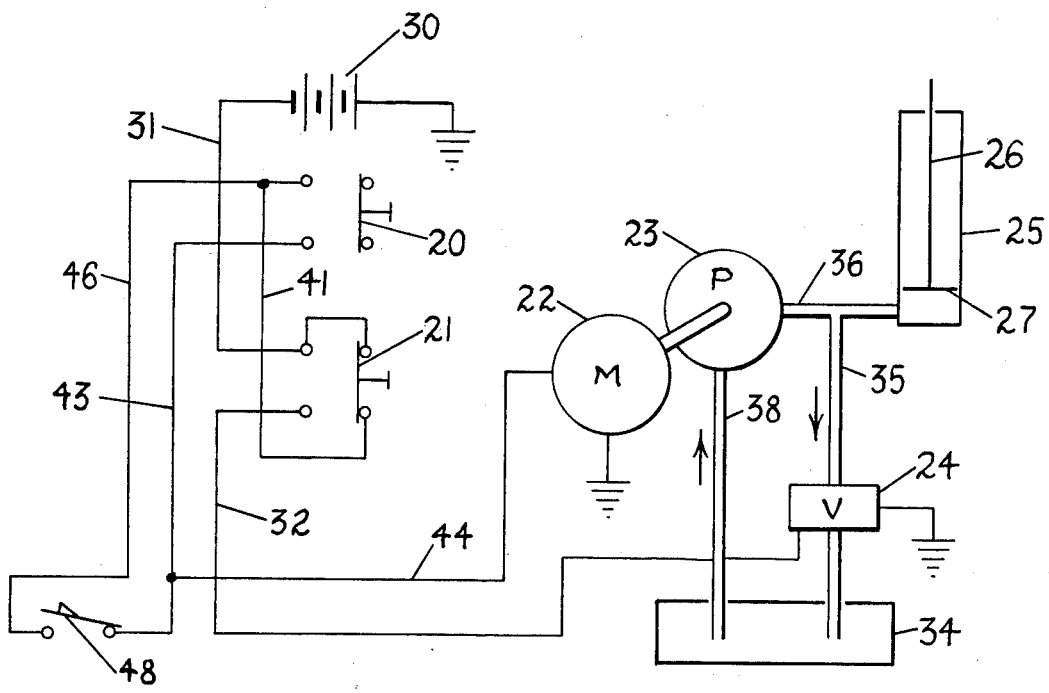
FIG. 2 is diagrammatic view showing the electrical and hydraulic circuitry of the fork raising and lowering circuits in accordance with one form of the present invention.

Referring now to the wiring diagram, FIG. 2, the numerals 20 and 21, as indicated previously herein, designate UP and DOWN push button switches which are biased to normally open positions as shown in FIG. 2. The push buttons 20 and 21, respectively, effect control of an electric motor 22 which operates a hydraulic pump 23 to raise the forklift mechanism of the apparatus and a normally closed solenoid valve 24 which operates to lower the forklift mechanism. A hydraulic cylinder shown at 25 in FIG. 2 is fixed to the support structure 10 and the upper end of piston rod 26 of a piston 27 of cylinder 25 connects with and moves the vertically movable forklift structure 12.

The power source comprises a storage battery 30. When the DOWN push button 21 is depressed it connects solenoid valve 24 with storage battery 30 by way of conductors 31 and 32 to lower the fork structure by dumping fluid from the lower side of piston 25 to a tank 34 by way of a fluid conduit 35 which connects with conduit 36 which extends between the output side of pump 23 and the lower end of cylinder 25. The inlet side of pump 23 connects with tank 34 by way of a conduit 38.

When the UP push button 20 is depressed it energizes the motor 22 by way of conductor 31, through the switch of DOWN push button 21 which is now in the off position shown in FIG. 2, through conductor 41 to the upper contact of the switch controlled by push button 20, through the switch and, by way of conductors 43 and 44, to motor 22.

When the operator has lowered the fork structure to its lowermost position, or at least a position lower than the somewhat raised position desired in accordance with the present invention, and the operator then releases push button 21 so that it assumes the position illustrated in FIG. 2, the fork structure would normally remain in such fully lowered or nearly fully lowered position. However, in accordance with the present invention an auxiliary fork raising circuit is established in the following manner. When the DOWN push button 21 is released power from the battery 30 is connected to the upper side of push button switch 21 in its released position by way of conductor 31, thence through switch 21 and conductor 41 and a conductor 46 which contains limit switch 48 and thence by way of conductor 44 to motor 22. Limit switch 48 is normally open but is closed under the foregoing conditions in a manner which will presently appear.

This auxiliary circuit, accordingly, acts to raise the fork structure of the truck automatically upon release of the DOWN push button 21 until this auxiliary circuit is opened by operation of the limit switch 48 which will now be described.

Figure 3:
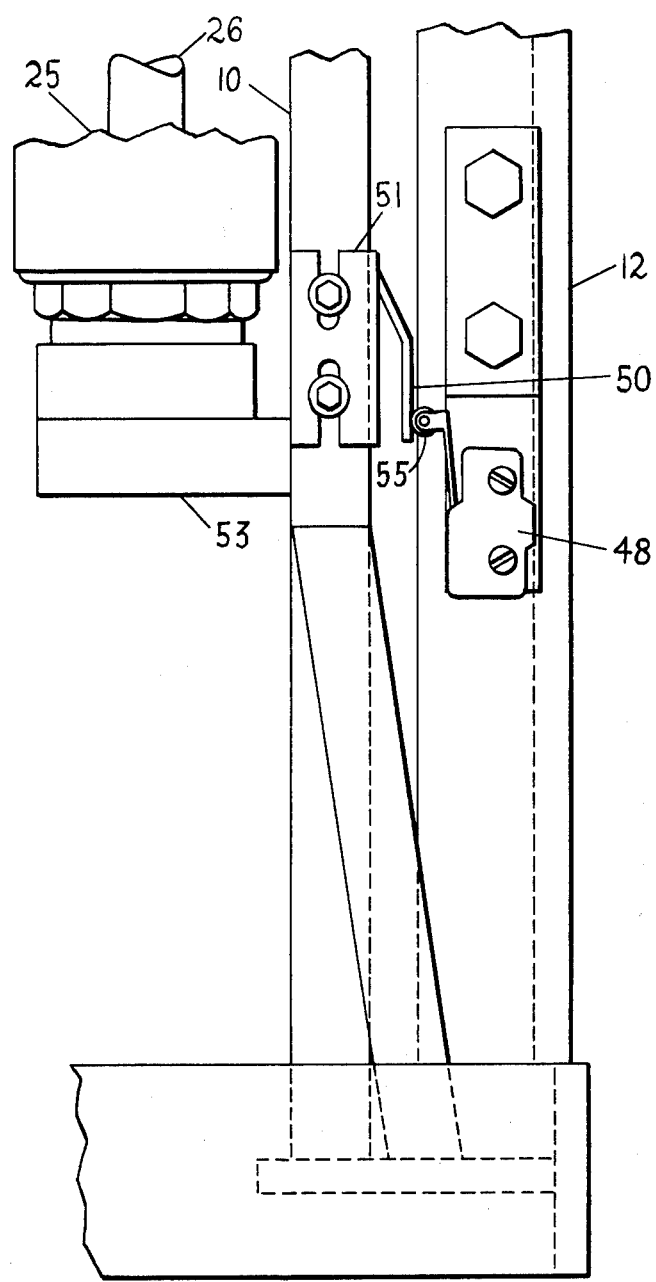
FIG. 3 is a fragmentary elevational view showing a limit switch arrangement employed in the illustrated form of the present invention.

In FIG. 1 the limit switch is indicated generally at 48 and the details thereof are illustrated in FIG. 3. FIG. 3 shows a portion of the support structure 10 of the pallet truck and a portion of the vertically movable fork structure is shown at 12. The normally open limit switch 48 is mounted on the fork structure 12 and FIG. 3 shows the fork structure in a lowered position wherein switch 48 is held closed by a cam portion 50 of a bracket 51 which is attached to the support structure 10. In the present instance the cam bracket 51 is vertically adjustable with respect to support structure 10.

In FIG. 3 the hydraulic power cylinder 25 for raising the fork structure is shown mounted at its lower end on a bracket 53 extending laterally from support structure 10.

When the operator releases DOWN button 21 with the fork structure in a lowered position the limit switch 48 is held closed by cam portion 50 and the auxiliary circuit described above causes upward movement of the fork structure until the operating member 55 of limit switch 48 moves off of the upper end of cam portion 50 whereupon the auxiliary circuit opens with the fork structure raised sufficiently above the surface of the floor upon which the apparatus is moving to avoid undue wear of the under surfaces of the forks or damage to the floor.

The auxiliary circuit then remains open until the fork structure is again moved down to a point where the operator 55 of switch 48 rides onto cam portion 50 to close switch 48 and condition the auxiliary circuit for fork raising operation whenever the DOWN button 21 is released. The fork structure is thus hydraulically locked in a position a slight distance above its lowermost position until subsequent operation thereof by manual depression of either of the UP or DOWN push buttons 20 and 21.

A preferred embodiment of this invention having been hereinabove described and illustrated in the drawings, it is to be understood that numerous modifications thereof can be made without departing from the broad spirit and scope of this invention as defined in the appended claims.

I claim:

1. In a lift truck, a frame structure and a lift structure mounted thereon for vertical movement to raise and lower pallets and the like, means for effecting up and down movement of said lift structure, a pair of manually operable controls for selectively activating said means for up or down movements of said lift structure, an auxiliary electric circuit operable when both of said controls are in released position to activate said means for up movement of said lift structure when the same is in a lowered position, and a switch in said auxiliary circuit adapted to be opened by upward movement of said lift structure to a predetermined point at which the lift structure is safely out of contact with the floor upon which the truck is operating.

2. A lift truck according to claim 1 wherein said means for effecting up and down movements of said pallet lift structure comprise electrical means and wherein said manually operable controls comprise electrical switches.

3. A lift truck according to claim 1 wherein said up-movement means comprises an electric motor and pump unit and a hydraulic cylinder activated thereby and wherein said down-movement means comprises an electrically actuated dump valve from said cylinder for gravitational lowering of said lift structure.

4. A pallet truck according to claim 1 wherein said auxiliary circuit switch is carried by one of said structures and a switch actuating member is carried by the other of said structures.

5. A lift truck according to claim 2 wherein said up-movement means comprises an electric motor and pump unit and a hydraulic cylinder activated thereby and wherein said down-movement means comprises an electrically actuated dump valve from said cylinder for gravitational lowering of said lift structure.

6. A pallet truck according to claim 2 wherein said auxiliary circuit switch is carried by one of said structures and a switch actuating member is carried by the other of said structures.

7. A lift truck according to claim 1 wherein said auxiliary circuit switch is a normally open limit switch carried by said frame structure and control means therefor is carried by said lift structure.

8. A pallet truck according to claim 1 wherein said auxiliary circuit includes a second switch which is opened when said down movement switch is closed.

9. A pallet truck according to claim 2 wherein said auxiliary circuit includes a second switch which is opened when said down movement switch is closed.

10. A pallet truck according to claim 4 wherein said auxiliary circuit includes a second switch which is opened when said down movement switch is closed.

* * * * *